US010476613B2

(12) United States Patent
Ikeda et al.

(10) Patent No.: US 10,476,613 B2
(45) Date of Patent: Nov. 12, 2019

(54) COMMUNICATION STATE ANALYSIS METHOD AND COMMUNICATION STATE ANALYSIS SYSTEM

(71) Applicant: HONDA MOTOR CO., LTD., Minato-ku, Tokyo (JP)

(72) Inventors: Yuichiro Ikeda, Tochigi-ken (JP); Kanata Yamashita, Tochigi-ken (JP); Masaaki Kawamata, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/112,895

(22) Filed: Aug. 27, 2018

(65) Prior Publication Data

US 2019/0068299 A1   Feb. 28, 2019

(30) Foreign Application Priority Data

Aug. 31, 2017   (JP) ................. 2017-167083

(51) Int. Cl.
| G07C 5/00 | (2006.01) |
| H04B 17/15 | (2015.01) |
| G07C 5/08 | (2006.01) |
| G06T 11/20 | (2006.01) |
| H04B 17/29 | (2015.01) |

(Continued)

(52) U.S. Cl.
CPC ............ *H04B 17/15* (2015.01); *G06T 11/206* (2013.01); *G07C 5/0808* (2013.01); *H04B 17/29* (2015.01); *H04B 17/318* (2015.01); *H04B 17/391* (2015.01); *H04B 17/23* (2015.01)

(58) Field of Classification Search
CPC ................. G07C 5/0808; G07C 5/00
See application file for complete search history.

(56) References Cited

U.S. PATENT DOCUMENTS

2004/0127162 A1   7/2004   Maki et al.
2008/0208609 A1*  8/2008   Preece ............... G06Q 10/06
                                                    705/1.1

(Continued)

FOREIGN PATENT DOCUMENTS

JP    07-110350    4/1995
JP    09-102766    4/1997

(Continued)

*Primary Examiner* — Cindy Trandai
(74) *Attorney, Agent, or Firm* — Amin, Turocy & Watson LLP

(57) ABSTRACT

An inspection terminal measures a wireless quality of a host machine during inspection of an object to be inspected, and acquires performance measurement data indicative of the wireless quality. An environment measuring device measures a radio wave intensity in the vicinity of the host machine during inspection of the object to be inspected, and acquires environment measurement data indicative of the radio wave intensity. A movable body (vehicle) which is the object to be inspected, or a movable body that transports the object to be inspected, moves together with the inspection terminal and the environment measuring device, through execution points of a plurality of inspection processes performed within an inspection area. A LET server associates the performance measurement data and the environment measurement data with measurement times and/or the inspection processes.

9 Claims, 13 Drawing Sheets

(51) Int. Cl.
   *H04B 17/318* (2015.01)
   *H04B 17/391* (2015.01)
   *H04B 17/23* (2015.01)

(56) References Cited

U.S. PATENT DOCUMENTS

| | | | | |
|---|---|---|---|---|
| 2011/0195699 | A1* | 8/2011 | Tadayon | H04B 5/0062 |
| | | | | 455/418 |
| 2012/0158238 | A1* | 6/2012 | Daley | G07C 5/00 |
| | | | | 701/29.1 |
| 2014/0309949 | A1 | 10/2014 | Nagata | |
| 2015/0183440 | A1* | 7/2015 | Jackson | B60W 40/06 |
| | | | | 701/31.4 |
| 2015/0219785 | A1* | 8/2015 | Tudor | G01V 5/0016 |
| | | | | 378/57 |
| 2016/0203651 | A1* | 7/2016 | Heath | G06Q 50/30 |
| | | | | 705/13 |
| 2017/0124784 | A1* | 5/2017 | Wittmann | G06K 9/00711 |
| 2019/0056479 | A1* | 2/2019 | Park | G01S 13/89 |

FOREIGN PATENT DOCUMENTS

| | | |
|---|---|---|
| JP | 3742057 | 11/2005 |
| JP | 4084987 | 4/2008 |
| JP | 2011-114415 | 6/2011 |
| JP | 2011-114416 | 6/2011 |
| JP | 2014-206941 | 10/2014 |

* cited by examiner

| DATE | MEASUREMENT TIME | RADIO WAVE INTENSITY | CHANNEL | CONNECTION DESTINATION MAC ADDRESS | ... |
|---|---|---|---|---|---|
| ... | ... | ... | ... | ... | ... |
| 2017/02/01 | 14:38:53 | -45 | 1 | 00:57:D2:87:DF:A0 | ... |
| 2017/02/01 | 14:38:53 | -50 | 6 | 00:22:CF:98:5A:9D | ... |
| 2017/02/01 | 14:38:54 | -42 | 1 | 00:57:D2:87:DF:A0 | ... |
| 2017/02/01 | 14:38:54 | -53 | 6 | 00:22:CF:98:5A:9D | ... |
| 2017/02/01 | 14:38:55 | -41 | 1 | 00:57:D2:87:DF:A0 | ... |
| 2017/02/01 | 14:38:55 | -55 | 6 | 00:22:CF:98:5A:9D | ... |
| ... | ... | ... | ... | ... | ... |

| No. | DATE | TIME | DATA CLASSIFICATION | SSID | RECEPTION STRENGTH | MESSAGE |
|---|---|---|---|---|---|---|
| 19241 | 20170201 | 14:23:56 | INFO | Wifi[LET1] SQ:74 RSSI:-63 | | ............ |
| 19242 | 20170201 | 14:23:57 | INFO | Wifi[LET1] SQ:76 RSSI:-62 | | ............ |
| 19243 | 20170201 | 14:23:58 | INFO | Wifi[LET1] SQ:72 RSSI:-64 | | ............ |
| 19244 | 20170201 | 14:23:58 | DEBUG | Process Bitmap error.(BITMAPDRIVE) | | ............ |
| 19245 | 20170201 | 14:23:58 | DEBUG | Process Bitmap error.(BITMAPDRIVE) | | ............ |
| 19246 | 20170201 | 14:23:58 | DEBUG | Process END : X170 | | INSPECTION PROCESS ID |
| 19247 | 20170201 | 14:23:58 | DEBUG | Process START : X180 | | |
| 19248 | 20170201 | 14:23:59 | INFO | Wifi[LET1] SQ:72 RSSI:-64 | | ............ |
| 19249 | 20170201 | 14:23:59 | INFO | Wifi[LET1] SQ:74 RSSI:-63 | | ............ |
| 19250 | 20170201 | 14:24:00 | INFO | Wifi[LET1] SQ:76 RSSI:-62 | | ............ |
| 19251 | 20170201 | 14:24:01 | INFO | Wifi[LET1] SQ:72 RSSI:-64 | | ............ |
| 19252 | 20170201 | 14:24:02 | INFO | Wifi[LET1] SQ:72 RSSI:-64 | | ............ |

FIG. 8  D2

| DATE | MEASUREMENT TIME | RADIO WAVE INTENSITY | CHANNEL | CONNECTION ERROR DETECTION FLAG | CONNECTION DESTINATION MAC ADDRESS | CONNECTION DESTINATION SSID | ... |
|---|---|---|---|---|---|---|---|
| ... | ... | ... | ... | ... | ... | ... | ... |
| 2017/02/01 | 14:38:53 | -54 | 6 | 0 | 00:22:CF:98:5A:9D | LET1 | ... |
| 2017/02/01 | 14:38:54 | -54 | 6 | 0 | 00:22:CF:98:5A:9D | LET1 | ... |
| 2017/02/01 | 14:38:55 | -57 | 6 | 1 | 00:22:CF:98:5A:9D | LET1 | ... |
| 2017/02/01 | 14:38:56 | -59 | 6 | 0 | 00:57:D2:87:DF:A0 | LET1 | ... |
| 2017/02/01 | 14:38:57 | -45 | 1 | 0 | 00:57:D2:87:DF:A0 | LET1 | ... |
| 2017/02/01 | 14:38:58 | -45 | 1 | 0 | 00:57:D2:87:DF:A0 | LET1 | ... |
| ... | ... | ... | ... | ... | ... | ... | ... |

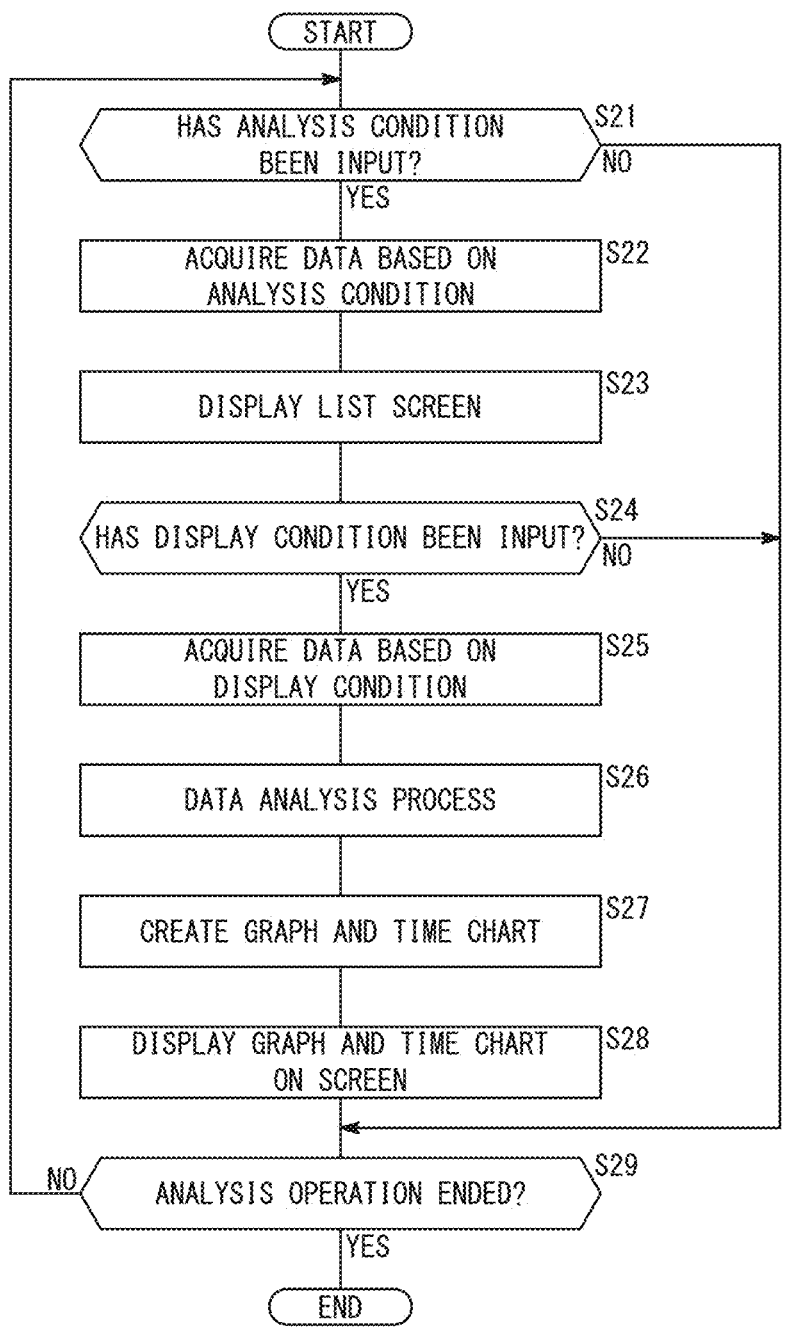

FIG. 11  D4

| INSPECTION PROCESS ID | DATE | START TIME | END TIME | ... |
|---|---|---|---|---|
| ... | ... | ... | ... | ... |
| X170 | 2017/02/01 | 14:20:40 | 14:23:58 | ... |
| X180 | 2017/02/01 | 14:23:58 | 14:27:15 | ... |
| X190 | 2017/02/01 | 14:27:15 | 14:32:00 | ... |
| ... | ... | ... | ... | ... |

COMMUNICATION STATE ANALYSIS METHOD AND COMMUNICATION STATE ANALYSIS SYSTEM

CROSS-REFERENCE TO RELATED APPLICATION

This application is based upon and claims the benefit of priority from Japanese Patent Application No. 2017-167083 filed on Aug. 31, 2017, the contents of which are incorporated herein by reference.

BACKGROUND OF THE INVENTION

Field of the Invention

The present invention relates to a communication state analysis method and a communication state analysis system adapted to analyze a communication state of inspection terminals that are used for inspecting objects to be inspected.

Description of the Related Art

Conventionally, various wireless devices have been used in order to construct a communications network in companies or factories. Upon the introduction of such wireless devices, it has been a general practice to optimize the number or the arrangement of the wireless devices, on the basis of the results of measuring and analyzing the communication state between the devices.

In Japanese Laid-Open Patent Publication No. 2011-114416, a radio wave state display device has been proposed, in which a relationship between installation locations of wireless devices and radio wave intensity is displayed in three dimensions for each of respective channels, by transmitting and receiving test signals (radio waves) to and from each of the wireless devices, under an environment in which the plurality of wireless devices are arranged in a distributed manner within a measurement area. Further, it is disclosed that a distribution of the radio wave intensities is estimated on the basis of values of the radio wave intensities measured at one point, and the distance to each of the wireless devices.

SUMMARY OF THE INVENTION

For example, in recent years, in a quality inspection facility in a vehicle production factory, inspection terminals having a wireless communications function are installed in vehicles to be inspected, and while the inspection terminals move together with the vehicles within a wide inspection area, a quality inspection made up of a plurality of inspection processes or steps is carried out. In the quality inspection facility, in order to implement such an inspection smoothly, it is required that the communication state during the inspection processes is kept stable.

In a wide location such as a vehicle production factory, since it is impossible to cover the entire factory with a wireless device provided in only one location, a plurality of such wireless devices are arranged in a distributed manner. Further, in the vehicle production factory, there are many cases in which obstacles (such as vehicles and buildings) made of metal and concrete and the like exist, which exert an influence on the radio waves. As a result, as the inspection terminals move within the factory together with the vehicles, there is a possibility that the performance of the wireless communications may change due to radio wave interference, the presence of obstacles, or the like.

However, according to Japanese Laid-Open Patent Publication No. 2011-114416, since the radio wave distribution is estimated without taking into consideration changes in performance as described above, there is a problem in that a divergence occurs in the radio wave intensities at the respective locations existing within the measurement area.

Thus, the present invention has the object of providing a communication state analysis method and a communication state analysis system, which are capable of analyzing with high accuracy a communication state of inspection terminals that are used for inspecting objects to be inspected.

A communication state analysis method according to a first aspect of the present invention is a method for analyzing a communication state of an inspection terminal having a wireless communications function and which is used for inspecting an object to be inspected, comprising a performance measuring step in which the inspection terminal measures a wireless quality of a host machine during inspection of the object to be inspected, and acquires performance measurement data indicative of the wireless quality, an environment measuring step in which an environment measuring device measures a radio wave intensity in the vicinity of the host machine during inspection of the object to be inspected, and acquires environment measurement data indicative of the radio wave intensity, a moving step in which a movable body, which is the object to be inspected, or a movable body that transports the object to be inspected, moves together with the inspection terminal and the environment measuring device, through execution points of a plurality of inspection processes performed within an inspection area, and an associating step in which a data management device associates the performance measurement data and the environment measurement data with measurement times and/or the inspection processes.

In the foregoing manner, since the movable body, which is the object to be inspected, or the movable body that transports the object to be inspected, moves together with the inspection terminal and the environment measuring device, inspection of the object to be inspected is carried out under a condition in which the inspection terminal and the environment measuring device are at positions close to each other at all times, and it is possible to more accurately measure the radio wave intensity in the vicinity of the inspection terminal.

Furthermore, by associating the performance measurement data and the environment measurement data with the measurement times and/or the inspection processes, the method can be utilized for advanced analysis of the communication state, taking into consideration both the wireless quality and the radio wave intensity, for respective measurement times and/or each of the inspection processes.

In accordance with this feature, it is possible to analyze with high accuracy the communication state of the inspection terminal which is used for inspecting the object to be inspected. In particular, at a time of inspection involving the movable body, a plurality of execution points, a plurality of obstacles, and a plurality of movable bodies are assumed to exist within the inspection area, and the invention is particularly effective because unexpected communication states may easily occur.

Further, the communication state analysis method may further comprise a displaying step in which a display device displays on a same graph temporal changes in the wireless quality and the radio wave intensity, on the basis of the performance measurement data and the environment measurement data, which are associated by the data management device.

In accordance with this feature, the user is capable of grasping at a glance temporal changes (a time series of the communication state) in the wireless quality and the radio wave intensity, which are made visible as a graph. Further, by referring to the graph, it is possible to isolate and determine in a composite manner whether the cause of a malfunction in the communication state is due to one or both of the wireless quality and the radio wave intensity.

Further, in the displaying step, the display device may display together with the graph a time chart or a Gantt chart, in which time zones are demarcated according to a start time and an end time of each of the inspection processes. In accordance with this feature, the user is capable of grasping temporal changes in the wireless quality and the radio wave intensity, together with transitions of the plurality of inspection processes, and it is possible to perform an effective analysis in an isolated manner for each of the inspection processes.

Further, the inspection terminal and the environment measuring device may be capable of communicating wirelessly using a plurality of channels having different frequencies, and in the displaying step, the display device may display temporal changes in the wireless quality and the radio wave intensity in different display formats for each of the channels. In accordance with this feature, it is possible to perform an effective analysis in an isolated manner for each of the channels.

Further, the inspection terminal and the environment measuring device may be capable of communicating wirelessly via any of a plurality of wireless devices provided within the inspection area, and the communication state analysis method may further comprise a list displaying step in which the display device displays a list screen in which one or more of the wireless devices to be displayed in the displaying step can be selected. In accordance with this feature, one or more of the wireless devices, which serve as objects to be analyzed, can be easily selected via the list screen.

In addition, the communication state analysis method may further comprise an extracting step in which a display control device, which is the same as or different from the data management device, extracts an abnormal time zone in which the temporal change in the wireless quality and/or the radio wave intensity is abnormal, and in the displaying step, the display device may display together with the graph visible information indicating the extracted abnormal time zone. In accordance with this feature, the user can easily grasp that the communication state is abnormal, and the abnormal time zone corresponding thereto.

The inspection terminal and the environment measuring device may be configured as an integrated device having an independent data acquisition function. In accordance with this feature, management of the measuring devices is facilitated, and it is possible to constantly monitor the communication state during inspection.

Further, the inspection terminal and the environment measuring device may be configured as separate devices. In accordance with this feature, by introduction of a separate environment measuring device, an inspection system in which an inspection terminal is used, which does not have a function of measuring radio wave intensity, can be utilized without modification, and therefore, expandability of the system is enhanced.

A communication state analysis system according to a second aspect of the present invention comprises an inspection terminal having a wireless communications function and which is used for inspecting an object to be inspected, the inspection terminal being adapted to measure a wireless quality of a host machine, and acquire performance measurement data indicative of the wireless quality, an environment measuring device adapted to measure a radio wave intensity in the vicinity of the host machine, and acquire environment measurement data indicative of the radio wave intensity, a movable body, which moves together with the inspection terminal and the environment measuring device, through execution points of a plurality of inspection processes performed within an inspection area, and serves as a the object to be inspected or a transporting body adapted to transport the object to be inspected, and a data management device adapted to associate the performance measurement data and the environment measurement data with measurement times and/or the inspection processes.

In accordance with the communication state analysis method and the communication state analysis system according to the present invention, it is possible to analyze with high accuracy a communication state of inspection terminals that are used for inspecting objects to be inspected.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 5 is a diagram showing a specific example of environment measurement data, which is collectively transmitted to a LET server from the environment measuring device;

FIG. 7 is a diagram showing a specific example of inspection result data, which is collectively transmitted to the LET server from the inspection terminal;

FIG. 8 is a diagram showing a specific example of the performance measurement data, which is collectively transmitted to the LET server from the inspection terminal;

FIG. 9 is a flowchart showing a specific example of operations in an analysis operations terminal;

FIG. 11 is a diagram showing a specific example of process transition data extracted from the inspection result data;

DESCRIPTION OF THE PREFERRED EMBODIMENTS

Preferred embodiments of a communication state analysis method, in relation to a communication state analysis system according to the present invention, will be presented and described in detail below with reference to the accompanying drawings.

[Configuration]

<Inspection Area for Vehicles 12>

Figure 1:
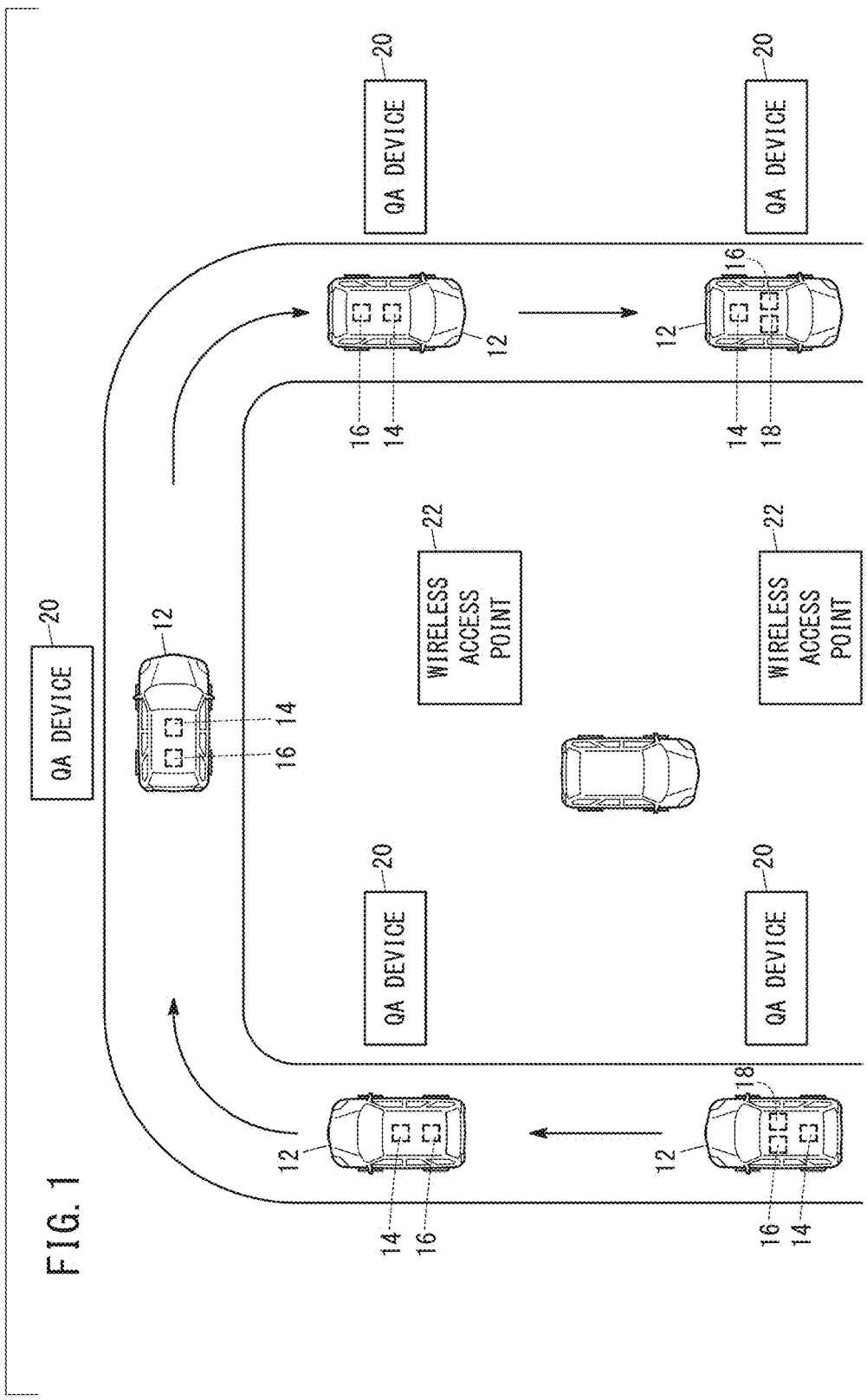
FIG. 1 is a diagram illustrating an inspection area for vehicles to which a communication state analysis system according to an embodiment of the present invention is applied.

FIG. 1 is a diagram illustrating an inspection area for vehicles 12 to which the communication state analysis system 10 according to an embodiment of the present invention is applied. In the inspection area, a quality inspection, which takes place through a plurality of inspection processes, is performed on the completed vehicles 12. The vehicles 12, which serve as objects to be inspected, move along a path having an arbitrary shape (in the present figure, a U-shaped path) while passing through execution points of each of the inspection processes that take place within the inspection area.

The vehicles 12 are each equipped with a computer referred to as an ECU (Electronic Control Unit) 14, which comprehensively controls various non-illustrated functional devices (for example, an engine, an air conditioner, safe driving support equipment, etc.). In respective inspection processes, it is checked whether or not vehicle functions realized by one or a plurality of functional devices are being performed normally.

Before the inspection is initiated, inspection terminals 16 referred to as LETs (Line End Testers) are connected respectively to the vehicles 12 and installed inside the passenger compartments thereof. Consequently, the inspection terminals 16 are configured to be capable of communicating mutually with the ECUs 14 via a wired or wireless in-vehicle network. Further, in addition to the inspection terminals 16, environment measuring devices 18 may further be installed in at least a portion from among the plurality of vehicles 12 (in the example shown in FIG. 1, one each is installed at an upstream location and a downstream location). Moreover, in the present embodiment, the inspection terminals 16 and the environment measuring devices 18 are configured as separate devices.

The inspection terminals 16 have a wireless communications function, and are terminals used for inspection of the vehicles 12. More specifically, as wireless communication techniques that can be used, there may be cited narrowband wireless communications, including WiFi, Bluetooth (registered trademark), and ZigBee (registered trademark).

The inspection terminals 16 cooperate with the ECUs 14 and QA (Quality Assurance) devices 20, and acquire inspection result data D1 indicative of the results of quality inspections executed in each of the respective inspection processes. During inspection of the vehicles 12, each of the inspection terminals 16 measures the wireless quality of its own device (referred to as a host machine) and acquires performance measurement data D2 indicative of the wireless quality.

"Wireless Quality" implies a quality related to the radio waves that are used, and which are actually transmitted and received at a time that wireless communications are carried out with a wireless device (in this instance, a wireless access point 22), and is a concept that differs from the radio wave intensity of the radio waves existing in a space surrounding the inspection terminals 16. The wireless quality may be, for example, a reception strength, a signal-to-noise ratio, or the like, and as examples of the former, there may be cited a received signal intensity (RSSI: Received Signal Strength Indicator) of a reference signal that is periodically transmitted by the wireless access point 22.

The environment measuring devices 18 have a wireless communications function, and are terminals that measure the radio wave intensity in the vicinity of the host machine during inspection of the vehicles 12, and acquire environment measurement data D3 indicative of the radio wave intensity. Each of the environment measuring devices 18 may be configured, for example, by externally connecting an environment measuring module with respect to a general-purpose personal computer.

Further, as shown in FIG. 1, N (N≥2) QA devices 20 and M (M≥1) wireless access points 22 are arranged in a distributed manner within the inspection area. The QA devices 20 are control devices, which are disposed at execution points (hereinafter also referred to as inspection points) of each of the respective inspection processes, and manage the execution of the respective inspection processes. The wireless access points 22 are wireless relay devices (wireless master units) for the purpose of connecting wireless devices such as the inspection terminals 16 and the environment measuring devices 18 to a wired network. Moreover, the inspection terminals 16 and the environment measuring devices 18 are capable of communicating wirelessly with the wireless access points 22 using a plurality of channels having different frequencies.

<Configuration of Communication State Analysis System 10>

Figure 2:
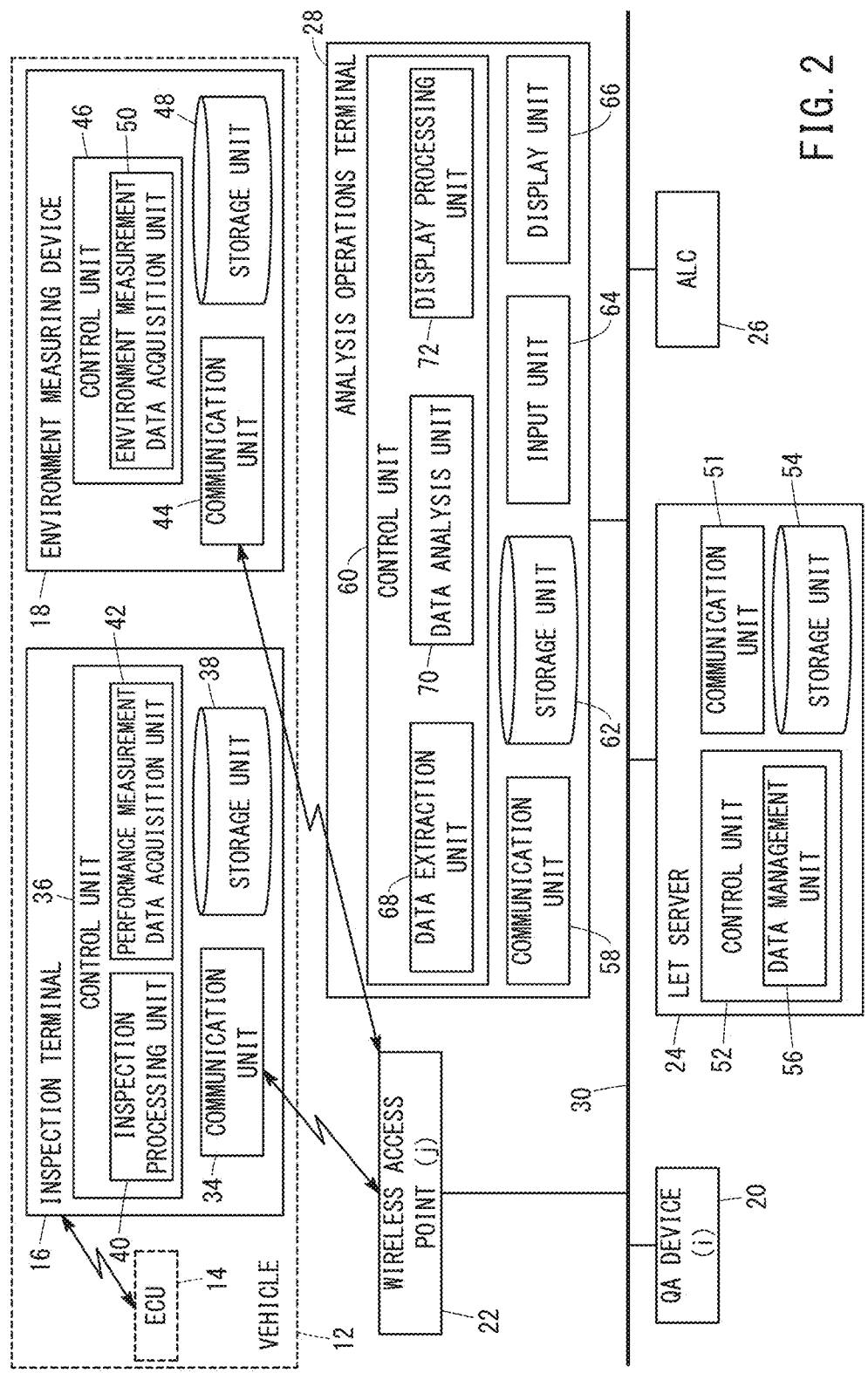
FIG. 2 is an overall configuration diagram of the communication state analysis system shown in FIG. 1.
Figure 3:
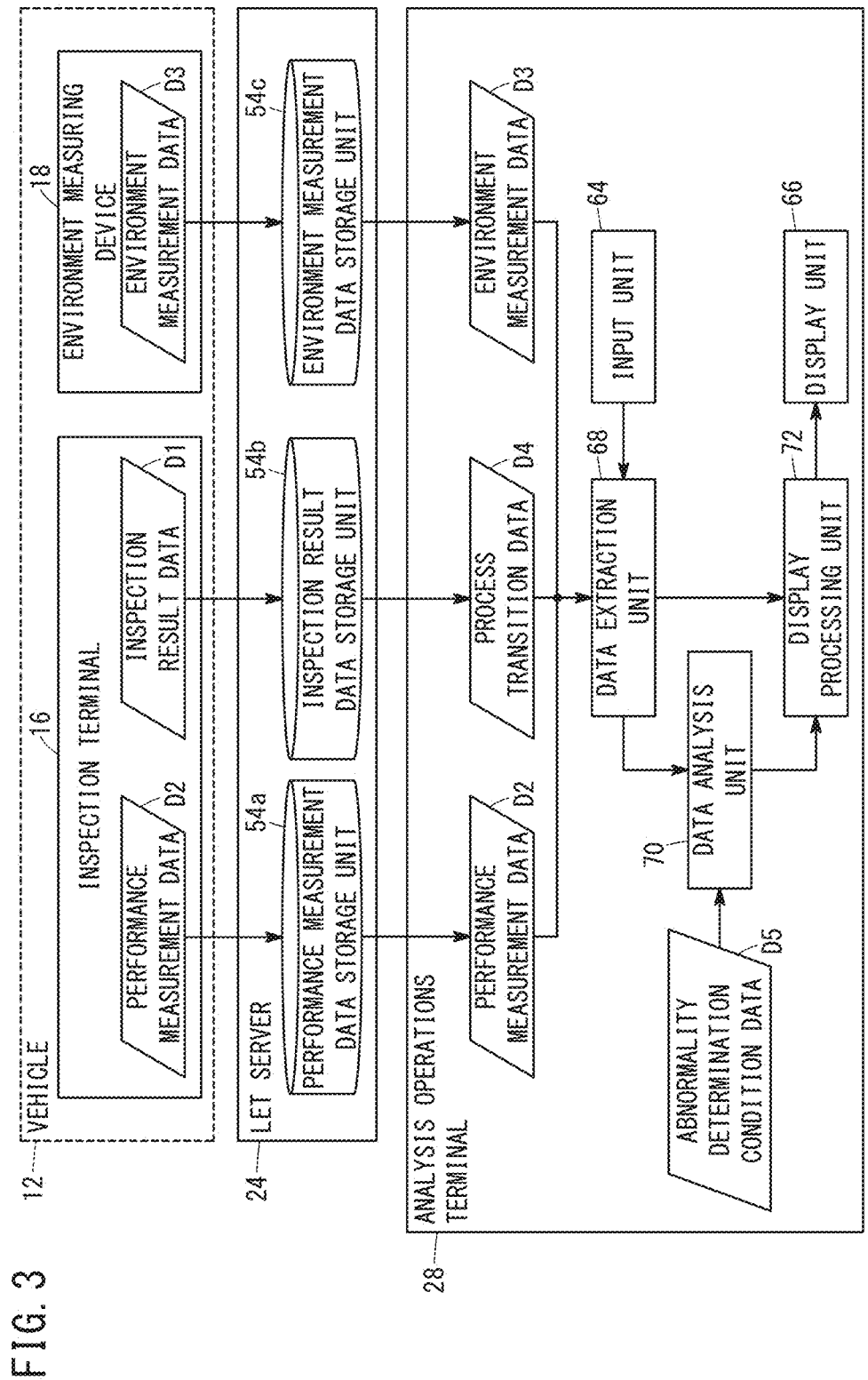
FIG. 3 is a block diagram for describing mutual relationships among a plurality of data acquired in the communication state analysis system shown in FIG. 2.

FIG. 2 is an overall configuration diagram of the communication state analysis system 10 shown in FIG. 1. FIG. 3 is a block diagram for describing mutual relationships among a plurality of data acquired in the communication state analysis system 10.

The communication state analysis system 10 is constituted from the inspection terminals 16 and the environment measuring devices 18 that are installed in the vehicles 12, first to ith (2≤i≤N) of the QA devices 20, first to jth (1≤j≤M) of the wireless access points 22, a LET server 24, a server (hereinafter referred to as an ALC: Assembly Line Control) 26 for controlling an assembly line in its entirety, and an analysis operations terminal 28. The wireless access points 22, the LET server 24, the ALC 26, and the analysis operations terminal 28 are connected so as to be capable of communicating bidirectionally via a LAN 30.

(A. Configuration of Inspection Terminals 16)

Each of the inspection terminals 16 is configured to include a communication unit 34, a control unit 36, and a storage unit 38. The communication unit 34 is made up from a communication module that transmits and receives electric signals to and from an external device. The storage unit 38 stores in advance an inspection program corresponding to a quality inspection implemented by each of the inspection processes, and a performance measuring program for measuring the performance of the wireless communications of the inspection terminal 16.

The control unit 36 is constituted from a processing computational device including a CPU (Central Processing Unit), an MPU (Microprocessing Unit), and the like. The control unit 36 functions as the inspection processing unit 40 and the performance measurement data acquisition unit 42, by reading out and executing an inspection program and a performance measurement program from the storage unit 38.

Upon receiving instructions to execute inspection processes from the QA devices 20 via the communication unit 34 and the wireless access points 22, the inspection processing unit 40 cooperates with the ECU 14 to execute predetermined inspection processes with respect to the functional devices. The control unit 36 stores the inspection results as inspection result data D1 in the storage unit 38, and transmits the inspection result data D1 to the QA devices 20.

The performance measurement data acquisition unit 42 performs a performance measurement process, and together therewith, extracts necessary information from among the performance measurement results, and acquires the information as performance measurement data D2 indicative of the reception strength, which is one form of the wireless quality. The performance measurement process is performed, for example, by transmitting ping signals at a predetermined cycle with respect to the wireless access points 22 that are connection destinations, and receiving response results. Details concerning the performance measurement data D2 will be described later.

The storage unit 38 is constituted from a non-transitory computer readable storage medium. In this instance, the computer readable storage medium is a storage medium in the form of a portable medium, such as a magneto-optical disk, a ROM, a CD-ROM, a flash memory, or the like, or a hard disk that is incorporated in a computer system.

(B. Configuration of Environment Measuring Devices 18)

Each of the environment measuring devices 18 is configured to include a communication unit 44, a control unit 46, and a storage unit 48. The configurations of the respective units are the same as those of the inspection terminals 16. However, in the storage unit 48, an environment measurement data acquisition program is stored, which measures the radio wave intensity of the radio waves existing in the surrounding space. Therefore, the control unit 46 functions as an environment measurement data acquisition unit 50, by reading out and executing an environment measurement data acquisition program from the storage unit 48.

The environment measurement data acquisition unit 50 performs an environment measurement process, and together therewith, extracts necessary information from among the measurement results, and acquires the information as environment measurement data D3 indicative of the radio wave intensity. Details concerning the environment measurement data D3 will be described later.

(C. Configuration of LET Server 24)

The LET server 24 is a data management device that collects the inspection result data D1 and the performance measurement data D2 from the inspection terminals 16 via the wireless access points 22, and the environment measurement data D3 from the environment measuring devices 18, and centrally manages such data in association with the measurement times and/or the inspection processes. In this instance, the phrase "manages in association with" implies that collected log data is read out and placed in an editable state.

The LET server 24 is configured to include a communication unit 51, a control unit 52, and a storage unit 54. The configurations of the respective units are the same as those of the inspection terminals 16. However, in the storage unit 54, a data management program for managing the various collected data is stored.

By reading out and executing the data management program from the storage unit 54, the control unit 52 functions as a data management unit 56. More specifically, as shown in FIG. 3, the data management unit 56 collects the data transmitted from the inspection terminals 16 and the environment measuring devices 18, and stores the data respectively in a performance measurement data storage unit 54a, an inspection result data storage unit 54b, and an environment measurement data storage unit 54c included in the storage unit 54.

(D. Configuration of Analysis Operations Terminal 28)

The analysis operations terminal 28 is configured to include a communication unit 58, a control unit 60, a storage unit 62, an input unit 64, and a display unit 66. The configurations of the communication unit 58, the control unit 60, and the storage unit 62 are the same as those of the inspection terminals 16. However, in the storage unit 62, a data extraction program, a data analysis program, and a display processing program are stored.

By reading out and executing the respective programs from the storage unit 62, the control unit 60 functions as a data extraction unit 68, a data analysis unit 70, and a display processing unit 72. In addition to the respective programs described above, in the storage unit 62, there is also stored abnormality determination condition data D5, which indicates a determination condition of a communication abnormality. The input unit 64 is an input device that accepts input information from the user. The display unit 66 is a display device that displays display data, which is output from the display processing unit 72.

On the basis of analysis conditions input from the user via the input unit 64, the data extraction unit 68 extracts the performance measurement data D2 and the environment measurement data D3 that are stored in the LET server 24, and outputs the data to the display processing unit 72. As specific examples of the analysis conditions, there may be cited a measurement target period for analyzing the communication state, a terminal ID of an inspection terminal 16, an ID of a wireless access point 22, and the like.

Further, the data extraction unit 68 is equipped with a function for extracting information concerning the inspection processes from within the inspection result data D1, and outputting the extracted results as process transition data D4 to the display processing unit 72.

The data analysis unit 70 compares the performance measurement data D2 and the environment measurement data D3, which were extracted by the data extraction unit 68, with the abnormality determination condition data D5 that is stored in the storage unit 62, and thereby determines the presence or absence of a communication abnormality within a data measurement period, and outputs the determination result to the display processing unit 72.

The display processing unit 72 associates the performance measurement data D2 and the environment measurement data D3 that were output from the data extraction unit 68 with measurement times, and creates a graph showing a temporal change of the wireless quality and the radio wave intensity, together with creating a time chart on the basis of the process transition data D4 in the same time zone. In addition, a communication state display screen in which the time chart is shown together with the graph is displayed on the display unit 66. Furthermore, the display processing unit 72 also includes a function of displaying in a distinguishable manner on the graph a time zone corresponding to a communication abnormality, in the case that a determination result of a communication abnormality is acquired from the data analysis unit 70.

[Operations]

Next, operations of the communication state analysis system 10, which is configured as described above, will be described with reference to FIGS. 4 to 13.

<Collection of Environment Measurement Data D3>

Figure 4:
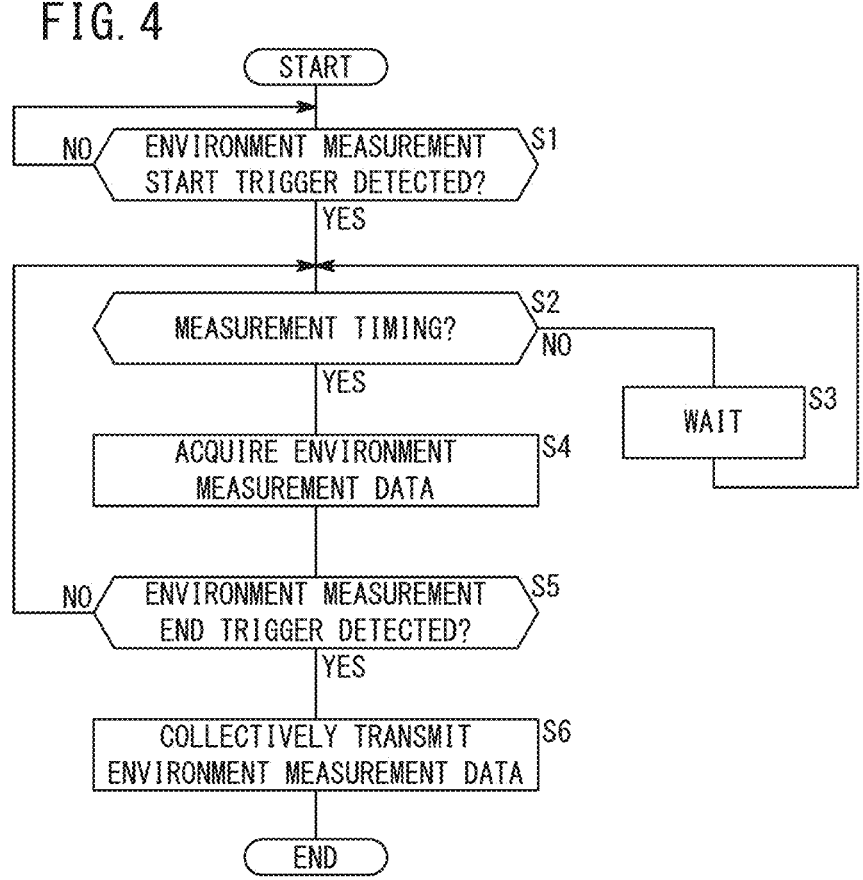
FIG. 4 is a flowchart showing a specific example of operations in an environment measuring device.

FIG. 4 is a flowchart showing a specific example of operations in the environment measuring device 18.

In step S1, the control unit 46 determines whether or not a start trigger for environment measurement (for example, a predetermined instruction operation made with respect to the inspection terminal 16) has been detected. In this instance, if it is determined that the start trigger for environment measurement has been detected (step S1: YES), the process proceeds to the following step S2. On the other hand, if it is determined that the start trigger for environment measurement has not been detected (step S1: NO), step S1 is repeated.

In step S2, the control unit 46 determines whether or not a measurement timing (for example, a predetermined time interval) for measurement of the radio wave intensity has arrived. In this instance, if it is determined that the measurement timing has arrived (step S2: YES), the process proceeds to the following step S4. On the other hand, if it is determined that the measurement timing has not arrived (step S2: NO), the control unit 46 waits for a predetermined time period (step S3), and then the process returns to step S2.

In step S4, the environment measurement data acquisition unit 50 performs the environment measurement process, and together therewith, extracts necessary information from among the measurement results, and temporarily stores the information as the environment measurement data D3 in the storage unit 48.

In step S5, the control unit 46 determines whether or not an end trigger for environment measurement (for example, a predetermined instruction operation made with respect to the inspection terminal 16) has been detected. In this instance, if it is determined that the end trigger for environment measurement has been detected (step S5: YES), the process proceeds to the following step S6. On the other hand, if it is determined that the end trigger for environment measurement has not been detected (step S5: NO), the process returns to step S2, and steps S2 to S5 are repeated.

In step S6, the control unit 46 collectively transmits the environment measurement data D3 that was stored in the storage unit 48 via the communication unit 44, either directly to the LET server 24, or alternatively, via the QA device 20 to the LET server 24, whereupon the process is ended.

FIG. 5 is a diagram showing a specific example of the environment measurement data D3, which is collectively transmitted to the LET server 24 from the environment measuring device 18. The environment measurement data D3 includes the date, the measurement time, the radio wave intensity, the channel, and the MAC address of the connection destination (i.e., the wireless access point 22), and the like.

<Collection of Inspection Result Data D1 and Performance Measurement Data D2>

Figure 6:
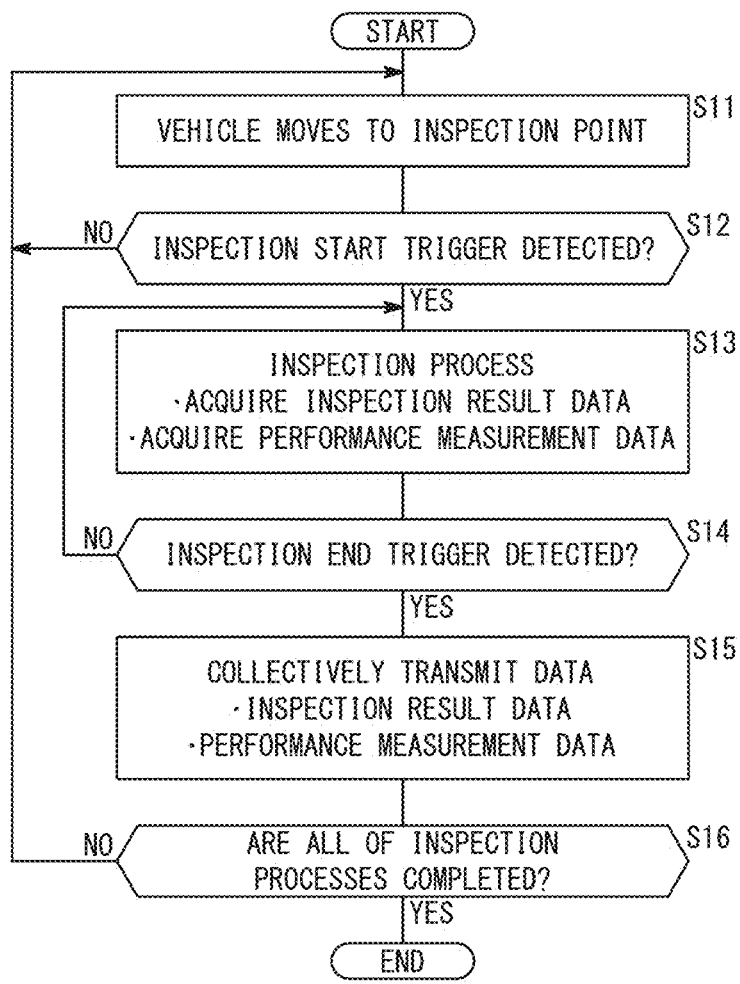
FIG. 6 is a flowchart showing a specific example of operations in a vehicle and an inspection terminal.

FIG. 6 is a flowchart showing a specific example of operations in the vehicle 12 and the inspection terminal 16. Such operations are performed asynchronously with the aforementioned operations of the environment measuring device 18 (see FIG. 4).

In step S11, the vehicle 12, which is an object to be inspected, moves to an inspection point of the inspection process which is provided within the inspection area.

In step S12, the control unit 36 of the inspection terminal 16 determines whether or not an inspection start trigger, which is transmitted from the QA device 20, has been detected. In this instance, if it is determined that the inspection start trigger has been detected (step S12: YES), the process proceeds to the following step S13. On the other hand, if it is determined that the inspection start trigger has not been detected (step S12: NO), the process returns to step S11.

In step S13, the inspection processing unit 40 acquires the inspection result data D1 that is generated by execution of the inspection process. Further, in parallel with the inspection process executed in the inspection processing unit 40, the performance measurement data acquisition unit 42 executes a performance measurement process at predetermined time intervals, and from among the measurement results thereof, acquires the performance measurement data D2, together with storing the performance measurement data D2 in the storage unit 38.

In step S14, the control unit 36 determines whether or not an inspection end trigger, which is transmitted from the QA device 20, has been detected. In this instance, if it is determined that the inspection end trigger has been detected (step S14: YES), the process proceeds to the following step S15. On the other hand, if it is determined that the inspection end trigger has not been detected (step S14: NO), the process returns to step S13.

In step S15, the control unit 36 collectively transmits the inspection result data D1 and the performance measurement data D2 of the storage unit 38 via the communication unit 34, either via the QA device 20 to the LET server 24, or alternatively, directly to the LET server 24.

In step S16, the inspection processing unit 40 determines whether or not all of the inspection processes have been completed. In this instance, if it is determined that all of the inspection processes have been completed (step S16: YES), the process is brought to an end. On the other hand, if it is determined that all of the inspection processes have not been completed (step S16: NO), the process returns to step S11.

FIG. 7 is a diagram showing a specific example of the inspection result data D1, which is collectively transmitted to the LET server 24 from the inspection terminal 16. The inspection result data D1 includes a data No., the date, the time, an inspection process ID, a data classification, the SSID of the connection destination (i.e., the wireless access point 22), the reception strength, messages, and the like.

FIG. 8 is a diagram showing a specific example of the performance measurement data D2, which is collectively transmitted to the LET server 24 from the inspection terminal 16. The performance measurement data D2 includes the date, the measurement time, the radio wave intensity, the channel, a connection error detection flag, and the MAC address and the SSID of the connection destination (i.e., the wireless access point 22), and the like.

<Screen Display of Communication State>

FIG. 9 is a flowchart showing a specific example of operations in the analysis operations terminal 28.

In step S21, the data extraction unit 68 determines whether or not an analysis condition has been input from the user via a non-illustrated input screen. In this instance, if it is determined that an analysis condition has been input (step S21: YES), the process proceeds to the following step S22. On the other hand, if it is determined that an analysis condition has not been input (step S21: NO), the process proceeds to step S29.

In step S22, the data extraction unit 68 performs an inquiry process on the analysis condition that was input in step S21, and acquires from the LET server 24 the performance measurement data D2 and the environment measurement data D3 that match with the analysis condition.

In step S23, the display processing unit 72 creates list screen data, on the basis of the performance measurement data D2 and the environment measurement data D3 that were acquired in step S22, and displays the list screen data on the display unit 66.

Figure 10:
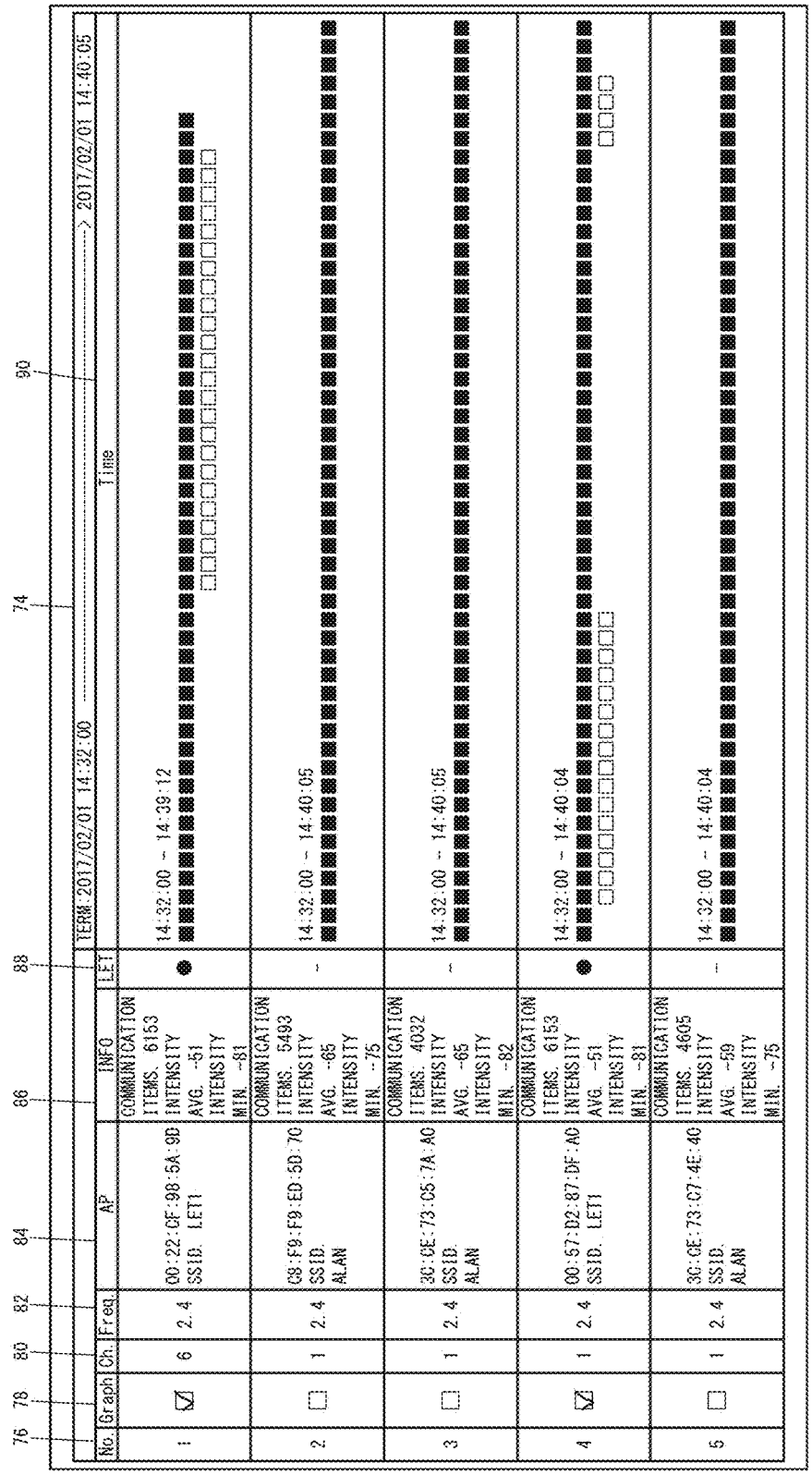
FIG. 10 is a diagram showing a specific example of the list screen, which is displayed on the analysis operations terminal.

FIG. 10 is a diagram showing a specific example of the list screen, which is displayed on the analysis operations terminal 28. In this instance, when "2017/02/01 14:32:00-2017/02/01 14:40:05" is designated as an analysis target period (TERM column 74), the performance measurement data D2 and the environment measurement data D3 whose measurement times are included within the analysis target period are displayed in association with the wireless access points 22.

In the list screen, there are included data numbers (No. column 76), check boxes (Graph column 78) by which target data to be shown graphically can be selected, channels (Ch. column 80), radio wave frequencies (Freq. column 82), MAC addresses and SSIDs of the wireless access points 22 (AP column 84), the number of communication items, and average values and minimum values of the radio wave intensity (INFO column 86), the presence or absence of a connection to the inspection terminal (LET) 16 (LET column 88), and information concerning measurement times and connection times (Time column 90).

Further, the black squares (■) displayed in the Time column 90 indicate time periods during which radio waves from a wireless access point 22 were measured, and the white squares (□) represent time zones during which the inspection terminal 16 was connected with respect to the same wireless access point 22. For example, when data having the data number "1" is referred to, it can be understood that the inspection terminal 16 is connected with respect to channel "6" of the wireless access point 22 having a MAC address of "00:22:CF:98:5A:9D", and the connection time period is on the order of about one half of the analysis target period (TERM column 74). Similarly, when data having the data number "4" is referred to, it can be understood that the inspection terminal 16 is connected with respect to a different wireless access point 22, in portions of a first half and a latter half of the analysis target period.

Consequently, one or more of the wireless devices (wireless access points 22), which serve as objects to be analyzed, can be easily selected via the list screen. For example, when a plurality of wireless access points 22 are arranged in a distributed manner within a wide inspection area such as an automobile production factory or the like, the acquired data is associated with the wireless access points 22 and is displayed to enable selection thereof. In addition, it is possible to evaluate the communication state by displaying only the communication data through a desired wireless access point 22.

In step S24, the data extraction unit 68 determines whether or not a display condition has been input on the list screen. In this instance, if it is determined that a display condition has been input (step S24: YES), the process proceeds to the following step S25. On the other hand, if it is determined that a display condition has not been input (step S24: NO), the process proceeds to step S29.

In step S25, on the basis of the display condition input on the list screen, the data extraction unit 68 acquires data to be displayed from the LET server 24. For example, in the list screen of FIG. 10, since data with the data numbers "1" and "4" are selected, information of the MAC address, the channel, and the measurement time included in each of such data is set as the display condition (key), and the inspection result data D1, the performance measurement data D2, and the environment measurement data D3 are acquired from the LET server 24. At this time, the data extraction unit 68 extracts the information concerning the inspection processes from within the inspection result data D1, and the extracted results are acquired as process transition data D4.

FIG. 11 is a diagram showing a specific example of the process transition data D4. The process transition data D4 includes, for example, an inspection process ID for identifying an inspection process, the date, a start time, an end time, and the like.

In step S26, the data analysis unit 70 executes a data analysis process on the basis of the abnormality determination condition data D5 of the storage unit 62, using the performance measurement data D2 and the environment measurement data D3, which are target data to be shown graphically, and extracts a time zone satisfying the abnormality determination condition.

In step S27, the display processing unit 72 creates a graph showing temporal changes in the radio wave intensity and the wireless quality occurring within the analysis target period that was input, and a time chart showing transitions of the inspection process.

In step S28, the display processing unit 72 outputs to the display unit 66 display data of the graph and the time chart that were created in step S27, and displays the display data as a communication state display screen.

Figure 12:
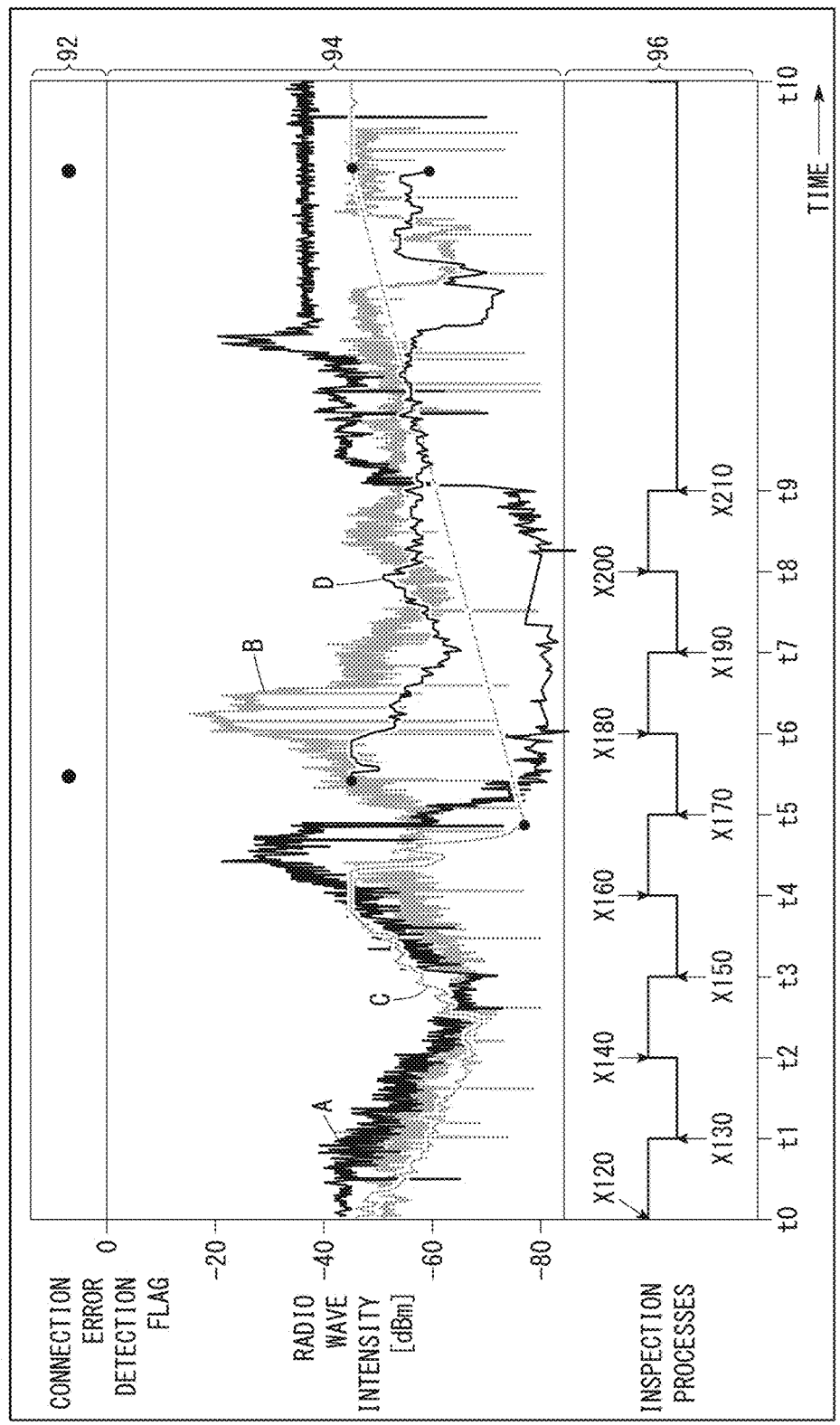
FIG. 12 is a diagram showing a specific example of a communication state display screen that is displayed on the analysis operations terminal.
Figure 13:
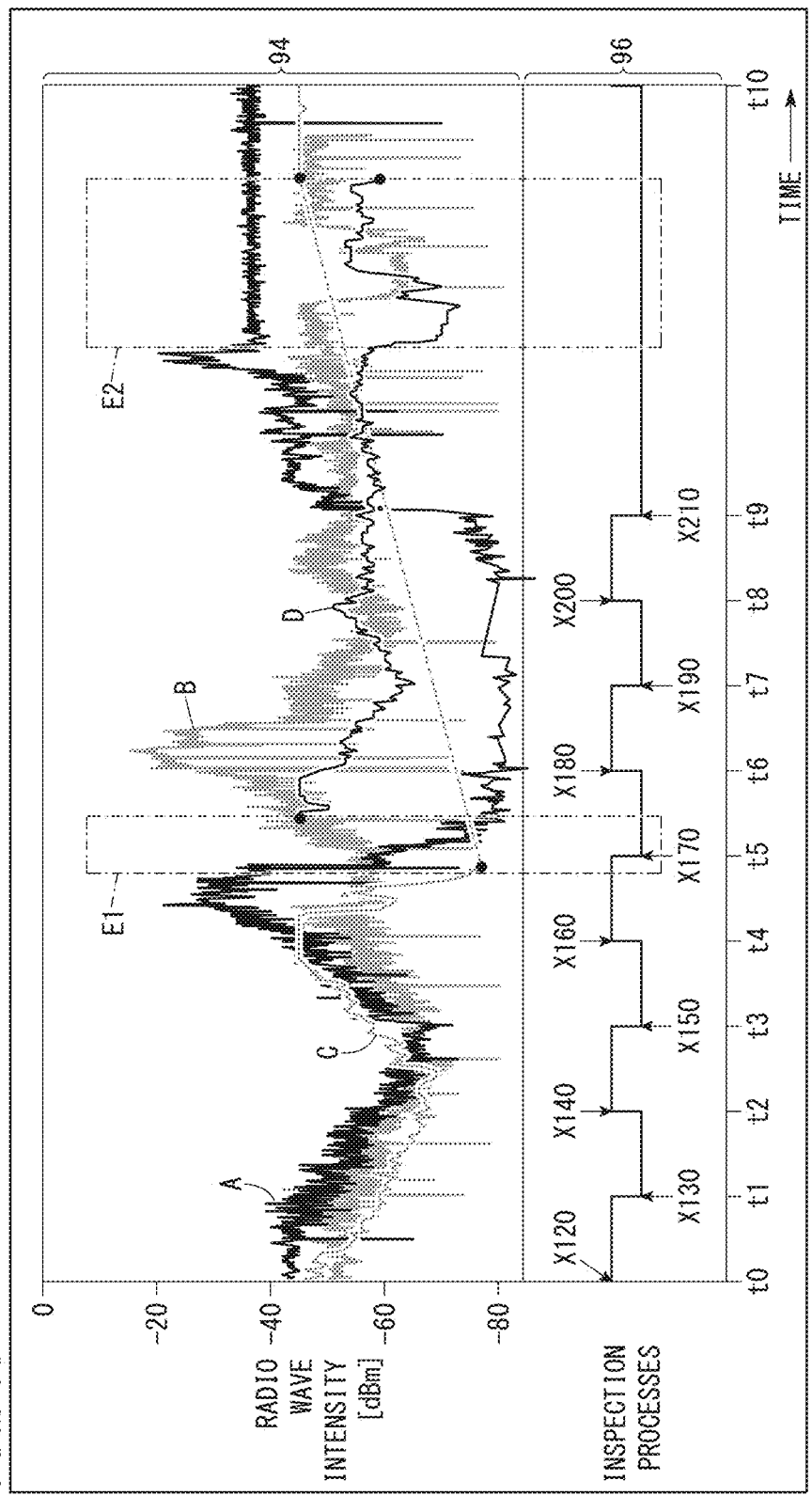
FIG. 13 is a diagram showing a specific example of the communication state display screen that is displayed on the analysis operations terminal.

FIGS. 12 and 13 are diagrams showing specific examples of the communication state display screen that is displayed on the analysis operations terminal 28. In FIG. 12, connection error detection flags (visible information) included in the performance measurement data D2 are displayed in an upper field 92, a graph showing temporal changes in the reception strength and the radio wave intensity is displayed in a central field 94, and a time chart in which time zones are demarcated according to a start time and an end time of the inspection processes included in the process transition data D4 is displayed in a lower field 96 of the screen, and the displays are arranged on a commonly shared time axis (horizontal axis).

Further, in the graph of FIG. 12, there are shown four types of waveforms indicated by the reference characters A to D, with the radio wave intensity being indicated on the vertical axis. The reference characters A to D correspond respectively to the environment measurement data D3 of {wireless access point: AP1/channel: "1"}, the environmental measurement data D3 of {wireless access point: AP2/channel: "6"}, the performance measurement data D2 of {connection destination of wireless access point: AP1/used channel: "1"}, and the performance measurement data D2 of {connection destination of wireless access point: AP2/used channel: "6"}. Moreover, the dashed line portion included within the waveform indicated by reference character C represents a time zone during which the inspection terminal 16 was not connected to the wireless access point 22. In accordance with this feature, the user is capable of grasping at a glance temporal changes (a time series of the communication state) in the wireless quality and the radio wave intensity, which are made visible as a graph. Further, by referring to the graph, it is possible to isolate and determine in a composite manner whether the cause of a malfunction in the communication state is due to one or both of the wireless quality and the radio wave intensity. Further, since the temporal changes in the wireless quality and the radio wave intensity are displayed on the graph in different display formats for each of the channels, it is possible to perform an effective analysis in an isolated manner for each of the channels.

Furthermore, on the communication state display screen shown in FIG. 12, by referring to the waveforms of reference characters C and D, it can be understood that channel switching (roaming) takes place within the time zone (from time t5 to time t6) of the inspection process "X170". Further, by referring to the waveforms of reference characters A to C, it can be understood that the inspection terminal 16 is continuing to catch hold of the radio waves of a channel ("6") having a weak radio wave intensity within the time zone (from time t9 to time t10) of the inspection process "X210", and that a channel ("1") exists having a stronger radio wave intensity.

In this manner, the user can easily grasp that the communication state is abnormal and the abnormal time zones corresponding thereto, based on temporal changes in the radio quality and the radio wave intensity which are made visible. Further, by referring to the graph, it is possible to isolate and determine in a comprehensive manner whether the cause of a malfunction in the communication state is due to one or both of the wireless quality and the radio wave intensity.

Further, by displaying together with the graph the time chart in which the time zones are demarcated according to the start time and the end time for each of the inspection processes, it is possible to grasp temporal changes in the wireless quality and the radio wave intensity, together with transitions of the plurality of inspection processes, and it is possible to perform an effective analysis in an isolated manner for each of the inspection processes. More specifically, in each of the inspection processes, it is possible to determine what kind of communication state is taking place in the inspection terminal 16. As a result, it can be easily determined whether or not a problem is occurring in the wireless quality and/or the radio wave intensity, and during execution of which inspection process the problem is occurring.

Furthermore, on the communication state display screen, the temporal changes in the wireless quality and the radio wave intensity are displayed on the graph in different display formats for each of the channels. In accordance with this feature, by grasping in chronological order a relationship between the wireless quality, the radio wave intensity, and the channels, it is possible to compare in each of the channels the radio wave intensities of the surrounding radio waves and the wireless quality in relation to actual communications, and it can easily be determined whether or not the channel under use is an optimum channel, or whether it is taking time to switch the channels.

In FIG. 13, the display field for the connection error detection flags (the upper field 92 shown in FIG. 12) is omitted, and in place thereof, visible information indicating abnormal time zones extracted in the data analysis unit 70 is displayed in a distinguishable manner by the one-dot-dashed line frames E1, E2 (visible information). Therefore, by referring to the communication state display screen, the user can easily grasp that the communication state is abnormal, and the abnormal time zone corresponding thereto.

In step S29, the control unit 60 determines whether or not an end command to end the analysis operation has been input on the screen. In this instance, if it is determined that an end command has been input (step S29: YES), the process is brought to an end. On the other hand, if it is determined that an end command has not been input (step S29: NO), the process returns to step S21, and steps S21 to S29 are repeated.

[Effects of the Embodiment]

In the manner described above, the communication state analysis system 10 according to the present embodiment comprises [1] the inspection terminals 16 having a wireless communications function and which are used for inspecting objects to be inspected, the inspection terminals 16 being adapted to measure a wireless quality of host machines, and acquire performance measurement data D2 indicative of the wireless quality, [2] the environment measuring devices 18 adapted to measure a radio wave intensity in the vicinity of the host machines, and acquire environment measurement data D3 indicative of the radio wave intensity, [3] movable bodies (vehicles 12), which move together with the inspection terminals 16 and the environment measuring devices 18, through execution points of a plurality of inspection processes performed within the inspection area, and serve as the objects to be inspected, and [4] the LET server 24 (data management device) adapted to associate the performance measurement data D2 and the environment measurement data D3 with measurement times and/or the inspection processes.

Further, the communication state analysis method in which the communication state analysis system 10 is used is a method for analyzing a communication state of the inspection terminals 16 having a wireless communications function and which are used for inspection of objects to be inspected, comprising [1] a performance measuring step (step S13) in which the inspection terminals 16 measure a wireless quality of host machines during inspection of the objects to be inspected, and acquire performance measurement data D2 indicative of the wireless quality, [2] an environment measuring step (step S4) in which the environment measuring devices 18 measure a radio wave intensity in the vicinity of the host machines during inspection of the objects to be inspected, and acquire environment measurement data D3 indicative of the radio wave intensity, [3] a moving step (step S11) in which movable bodies (vehicles 12), which are the objects to be inspected, move together with the inspection terminals 16 and the environment measuring devices 18, through execution points of a plurality of inspection processes performed within an inspection area, and [4] an associating step (step S6, step S15) in which the data management device (the LET server 24) associates the performance measurement data D2 and the environment measurement data D3 with measurement times and/or the inspection processes.

In the foregoing manner, since the vehicles 12 move together with the inspection terminals 16 and the environment measuring devices 18, inspection of the vehicles 12 is carried out under a condition in which the inspection terminals 16 and the environment measuring devices 18 are at positions close to each other at all times, and it is possible to more accurately measure the radio wave intensity in the vicinity of the inspection terminals 16.

Furthermore, by associating the performance measurement data D2 and the environment measurement data D3 with the measurement times and/or the inspection processes, the system and method can be utilized for advanced analysis of the communication state, taking into consideration both the wireless quality and the radio wave intensity, for respective measurement times and/or each of the inspection processes.

In accordance with this feature, it is possible to analyze with high accuracy the communication state of the inspection terminals 16 which are used for inspecting the vehicles 12. In particular, at a time of inspection involving the movable bodies, the plurality of execution points and the plurality of vehicles 12 are assumed to exist within the inspection area, and the invention is particularly effective because unexpected communication states may easily occur.

Further, the inspection terminals 16 and the environment measuring devices 18 may be configured as separate devices. By introduction of such separate environment measuring devices 18, an inspection system in which inspection terminals 16 are used, which do not have a function of measuring radio wave intensity, can be utilized without modification, and therefore, expandability of the system is enhanced.

[Modifications]

In the above-described embodiment, a single data management device (the LET server 24) is configured to centrally manage the inspection result data D1, the performance measurement data D2, and the environment measurement data D3. However, such data may be managed in a divided manner in a plurality of data management devices.

In the above-described embodiment, a configuration is provided in which the inspection result data D1, the performance measurement data D2, and the environment measurement data D3 are automatically associated with one another. However, at least a portion of such operations may be associated manually. For example, using the analysis operations terminal 28 as a data management device, the user may directly capture the inspection result data D1 and the performance measurement data D2, which are stored in the inspection terminals 16, and the environment measurement data D3, which is stored in the environment measuring devices 18, to thereby associate the data, and carry out an analysis of the communication state.

In the above-described embodiment, the inspection terminals 16 and the environment measuring devices 18 are separate devices, however, they may be configured as integrated devices having an independent data acquisition function. In accordance with this feature, management of the measuring devices is facilitated, and it is possible to constantly monitor the communication state during inspection. Further, since the wireless quality and the radio wave intensity are measured constantly at substantially the same position, the accuracy of the measurement data can be further improved.

In the above-described embodiment, the process transition data D4 is displayed in a time chart format, however, the data may be displayed in another chart format such as a Gantt chart. The display format is not limited, insofar as transitions of the inspection processes can be grasped in chronological order.

In the above-described embodiment, the graph and the time chart are displayed on the display device (display unit 66) of the analysis operations terminal 28. However, the graph and the time chart may be displayed on a display device that is connected to the data management device (the LET server 24).

In the above-described embodiment, a case has been shown in which the vehicles 12 themselves which is the object to be inspected constitute the movable bodies. However, a similar effect can be achieved in the case that vehicles, for example, AGVs (Autonomously Guided Vehicles) that transport the objects to be inspected serve as the movable bodies.

In the above-described embodiment, the data analysis process (step S26) in relation to the communication abnormality, and the display process (step S23 and step S28) are performed on the side of the analysis operations terminal 28, which includes the display control device and the display device. However, such processes may be carried out by the LET server 24 or by a different display control device.

In the above-described embodiment, a case has been shown in which the performance measurement data D2, the environment measurement data D3, and the process transition data D4 are displayed on the same screen. However, a configuration may be provided so as to enable one or more types of data from among the three types of data to be selected and displayed. In this case, an advantage is realized in that operations can be carried out separately for each of the types of data.

In the above-described embodiment, although the entity that analyzes the communication state is the user, instead of the user, the LET server 24 may analyze the communication state using an arbitrary analysis method, and the results thereof may be presented to the user.

[Supplemental Considerations]

The present invention is not limited to the above-described embodiment, and goes without saying that the present invention may be freely modified within a range that does not depart from the essence and gist of the invention. Alternatively, the respective configurations may be arbitrarily combined within a range in which technical inconsistencies do not occur therein.

What is claimed is:

1. A communication state analysis method for analyzing a communication state of an inspection terminal having a wireless communications function and which is used for inspecting an object to be inspected, comprising:
    a performance measuring step in which the inspection terminal measures a wireless quality of a host machine during inspection of the object to be inspected, and acquires performance measurement data indicative of the wireless quality;
    an environment measuring step in which an environment measuring device measures a radio wave intensity in the vicinity of the host machine during inspection of the object to be inspected, and acquires environment measurement data indicative of the radio wave intensity;
    a moving step in which a movable body, which is the object to be inspected, or a movable body that transports the object to be inspected, moves together with the inspection terminal and the environment measuring device, through execution points of a plurality of inspection processes performed within an inspection area; and
    an associating step in which a data management device associates the performance measurement data and the environment measurement data with measurement times and/or the inspection processes.

2. The communication state analysis method according to claim 1, further comprising a displaying step in which a display device displays on a same graph temporal changes in the wireless quality and the radio wave intensity, on the basis of the performance measurement data and the environment measurement data, which are associated by the data management device.

3. The communication state analysis method according to claim 2, wherein, in the displaying step, the display device displays together with the graph a time chart or a Gantt chart, in which time zones are demarcated according to a start time and an end time of each of the inspection processes.

4. The communication state analysis method according to claim 2, wherein:
    the inspection terminal and the environment measuring device are capable of communicating wirelessly using a plurality of channels having different frequencies; and
    in the displaying step, the display device displays temporal changes in the wireless quality and the radio wave intensity in different display formats for each of the channels.

5. The communication state analysis method according to claim 2, wherein:

the inspection terminal and the environment measuring device are capable of communicating wirelessly via any of a plurality of wireless devices provided within the inspection area; and further comprising a list displaying step in which the display device displays a list screen in which one or more of the wireless devices to be displayed in the displaying step can be selected.

6. The communication state analysis method according to claim 2, further comprising:

an extracting step in which a display control device, which is the same as or different from the data management device, extracts an abnormal time zone in which the temporal change in the wireless quality and/or the radio wave intensity is abnormal;

wherein, in the displaying step, the display device displays together with the graph visible information indicating the extracted abnormal time zone.

7. The communication state analysis method according to claim 1, wherein the inspection terminal and the environment measuring device are configured as an integrated device having an independent data acquisition function.

8. The communication state analysis method according to claim 1, wherein the inspection terminal and the environment measuring device are configured as separate devices.

9. A communication state analysis system, comprising:

an inspection terminal having a wireless communications function and which is used for inspecting an object to be inspected, the inspection terminal being adapted to measure a wireless quality of a host machine, and acquire performance measurement data indicative of the wireless quality;

an environment measuring device adapted to measure a radio wave intensity in the vicinity of the host machine, and acquire environment measurement data indicative of the radio wave intensity;

a movable body, which moves together with the inspection terminal and the environment measuring device, through execution points of a plurality of inspection processes performed within an inspection area, and serves as the object to be inspected or a transporting body adapted to transport the object to be inspected; and a data management device adapted to associate the performance measurement data and the environment measurement data with measurement times and/or the inspection processes.

* * * * *